(12) United States Patent
Babu et al.

(10) Patent No.: US 8,702,397 B2
(45) Date of Patent: Apr. 22, 2014

(54) SYSTEMS AND METHODS OF ASSEMBLING A ROTOR BLADE FOR USE IN A WIND TURBINE

(75) Inventors: Achuthan Babu, Bangalore (IN); Sachin K. Tripathi, Bangalore (IN); Afroz Akhtar, Bangalore (IN)

(73) Assignee: General Electric Company, Schenectady, NY (US)

( * ) Notice: Subject to any disclaimer, the term of this patent is extended or adjusted under 35 U.S.C. 154(b) by 1174 days.

(21) Appl. No.: 12/628,575

(22) Filed: Dec. 1, 2009

(65) Prior Publication Data

US 2010/0135818 A1 Jun. 3, 2010

(51) Int. Cl.
  *F03D 11/00* (2006.01)
(52) U.S. Cl.
  USPC ........................................................ 416/226
(58) Field of Classification Search
  USPC ........................................................ 416/226
  See application file for complete search history.

(56) References Cited

U.S. PATENT DOCUMENTS

| | | | | |
|---|---|---|---|---|
| 1,818,520 | A * | 8/1931 | Young | 244/35 R |
| 1,840,900 | A * | 1/1932 | Hicks et al. | 244/104 R |
| 1,842,068 | A * | 1/1932 | Carns | 244/124 |
| 2,326,430 | A | 8/1943 | Blanchard | |
| 2,412,908 | A | 12/1946 | Platt | |
| 2,461,351 | A | 2/1949 | Silverman | |
| 2,617,179 | A * | 11/1952 | Burke | 29/897.35 |
| 3,396,922 | A * | 8/1968 | Windecker | 244/123.5 |
| 4,162,777 | A * | 7/1979 | Gilbert et al. | 244/123.7 |
| 4,260,332 | A | 4/1981 | Weingart et al. | |
| 4,295,790 | A * | 10/1981 | Eggert, Jr. | 416/226 |
| 4,339,230 | A | 7/1982 | Hill | |
| 4,692,095 | A | 9/1987 | Lawson-Tancred | |
| 4,728,263 | A | 3/1988 | Basso | |
| 4,739,954 | A | 4/1988 | Hamilton | |
| 4,863,117 | A | 9/1989 | Riout | |
| 4,976,587 | A * | 12/1990 | Johnston et al. | 416/230 |
| 6,374,570 | B1 * | 4/2002 | McKague, Jr. | 52/762 |
| 7,198,471 | B2 | 4/2007 | Gunneskov et al. | |
| 7,205,066 | B1 * | 4/2007 | Hammi et al. | 429/119 |
| 7,377,752 | B2 * | 5/2008 | Mohamed | 416/226 |
| 8,021,114 | B2 * | 9/2011 | Lu | 416/131 |
| 2004/0253114 | A1 | 12/2004 | Gunneskov et al. | |
| 2005/0180854 | A1 | 8/2005 | Grabau et al. | |
| 2005/0186081 | A1 | 8/2005 | Mohamed | |
| 2006/0225278 | A1 | 10/2006 | Lin et al. | |
| 2006/0249626 | A1 * | 11/2006 | Simpson et al. | 244/123.1 |

(Continued)

FOREIGN PATENT DOCUMENTS

EP 0011330 A1 5/1980
GB 1544010 4/1979

(Continued)

*Primary Examiner* — Edward Look
*Assistant Examiner* — Aaron R Eastman
(74) *Attorney, Agent, or Firm* — James McGinness; Armstrong Teasdale LLP

(57) ABSTRACT

A method of assembling a rotor blade for use with a wind turbine. The method includes coupling a first sparcap to at least one first panel wall to form a first blade section, wherein the first sparcap has a first chordwise width. A second sparcap is coupled to at least one second panel wall to form a second blade section. The second sparcap has a second chordwise width that is larger than the first chordwise width. The first blade section is coupled to the second blade section to form the rotor blade.

18 Claims, 9 Drawing Sheets

(56) References Cited

U.S. PATENT DOCUMENTS

| | | |
|---|---|---|
| 2007/0040294 A1 | 2/2007 | Arelt |
| 2007/0189902 A1 | 8/2007 | Mohamed |
| 2007/0189903 A1 | 8/2007 | Eyb |
| 2007/0251090 A1 | 11/2007 | Breugel et al. |
| 2008/0107540 A1* | 5/2008 | Bonnet .................. 416/229 R |
| 2008/0206062 A1* | 8/2008 | Sanz Pascual et al. ....... 416/226 |
| 2009/0068017 A1 | 3/2009 | Rudling |
| 2009/0169392 A1* | 7/2009 | Kuroiwa et al. .......... 416/241 A |
| 2009/0196756 A1 | 8/2009 | Althoff |
| 2010/0080952 A1* | 4/2010 | Suzuki et al. ................. 428/113 |
| 2010/0135815 A1* | 6/2010 | Bagepalli et al. ............. 416/226 |
| 2010/0143142 A1* | 6/2010 | Akhtar .......................... 416/226 |

FOREIGN PATENT DOCUMENTS

| | | | | |
|---|---|---|---|---|
| GB | 2254382 A | | 7/1992 | |
| JP | 61190173 A | * | 8/1986 | ............... F03D 1/06 |
| WO | 03078833 A1 | | 9/2003 | |
| WO | 2004078465 A1 | | 9/2004 | |
| WO | 2008039076 A1 | | 4/2008 | |

* cited by examiner

SYSTEMS AND METHODS OF ASSEMBLING A ROTOR BLADE FOR USE IN A WIND TURBINE

BACKGROUND OF THE INVENTION

The embodiments described herein relate generally to a wind turbine rotor blade and, more particularly, to a sparcap system for a wind turbine rotor blade.

At least some known wind turbine rotor blades include two blade shell portions of fiber reinforced polymer. The blade shell portions are molded and then coupled together along cooperating edges using a suitable adhesive material. The blade shell portions typically include panel walls that are made using suitable, evenly distributed fibers, fiber bundles, or mats of fibers layered in a mold part. However, the panel walls are relatively light and have only low rigidity. Therefore, a stiffness and a rigidity, as well as a buckling strength, of the panel walls may not withstand the loads and forces exerted on the rotor blade during operation. To increase the strength of the rotor blade, the blade shell portions are reinforced by sparcaps laminated to the inner surface of the blade shell portions. Typically, the sparcaps extend substantially along a longitudinal length of the rotor blade. At least some known rotor blades include sparcaps with symmetrical cross-section widths and approximately equal cross-section areas. At least some known sparcaps are fabricated from suitable glass material.

Flapwise loads, which cause the rotor blade tip to deflect towards the wind turbine tower, are transferred along the rotor blade predominantly through the sparcaps. Further, with a continuously increasing length of wind turbine rotor blades in recent years, meeting stiffness requirements is a major concern in the structural design of the rotor blade. As such, conventional blade designs are either over-strengthened resulting in a heavier design or over-stiffened resulting in a costly design. In addition, conventional rotor blade designs include thicker panel walls and/or larger panel wall lengths so that panel walls are comparatively more expensive than sparcaps. At least some known wind turbine rotor blades include panel walls that are fabricated from suitable balsa material, which is relatively more expensive than sparcap material.

BRIEF DESCRIPTION OF THE INVENTION

In one aspect, a method of assembling a rotor blade for use with a wind turbine is provided. The method includes coupling a first sparcap to at least one first panel wall to form a first blade section, wherein the first sparcap has a first chordwise width. A second sparcap is coupled to at least one second panel wall to form a second blade section. The second sparcap has a second chordwise width that is larger than the first chordwise width. The first blade section is coupled to the second blade section to form the rotor blade.

In another aspect, a rotor blade for use with a wind turbine is provided. The rotor blade includes a first blade section that includes at least one first panel wall. A second blade section includes at least one second panel wall, and is coupled to the first blade section to form the rotor blade. A first sparcap is coupled to the first blade section and has a first chordwise width. A second sparcap coupled to the second blade section and has a second chordwise width that is greater than the first chordwise width.

In yet another aspect, a wind turbine is provided. The wind turbine includes a tower, a nacelle coupled to the tower, a hub rotatably coupled to the nacelle, and at least one rotor blade coupled to the hub. The rotor blade includes a first blade section that includes at least one first panel wall. A second blade section includes at least one second panel wall, and is coupled to the first blade section to form the rotor blade. A first sparcap is coupled to the first blade section and has a first chordwise width. A second sparcap coupled to the second blade section and has a second chordwise width that is greater than the first chordwise width.

The embodiments described herein facilitate assembling a rotor blade that meets rotor blade stiffness and deflection requirements with a reduced length of a panel wall. More specifically, the rotor blade described herein includes sparcaps that include asymmetric cross-section widths with approximately equal cross-section areas that provide a sufficient blade stiffness that enables the rotor blade to have a suitable tip deflection similar to conventional rotor blades. In addition, by providing sparcaps with asymmetric widths, a reduced amount of more expensive panel material is required to be included in a blade section, thereby reducing the overall costs of manufacturing the rotor blade.

BRIEF DESCRIPTION OF THE DRAWINGS

FIG. 1 is a perspective view of an exemplary wind turbine.

FIG. 2 is a sectional view of an exemplary rotor blade suitable for use with the wind turbine shown in FIG. 1.

FIG. 3 is a cross-sectional view of the exemplary rotor blade shown in FIG. 2.

FIGS. 4-6 are cross-sectional views of alternative embodiments of rotor blades suitable for use with the wind turbine shown in FIG. 1.

FIG. 7 is a sectional view of an alternative rotor blade suitable for use with the wind turbine shown in FIG. 1.

FIG. 8 is a cross-sectional view of the rotor blade shown in FIG. 7.

FIG. 9 is a flowchart of an exemplary method for assembling a rotor blade suitable for use with the wind turbine shown in FIG. 1.

DETAILED DESCRIPTION OF THE INVENTION

The embodiments described herein include a wind turbine that includes at least one rotor blade that includes a panel wall having a length shorter than a length of panel wall of a conventional rotor blade. More specifically, in one embodiment, the rotor blade described herein includes sparcaps having asymmetrical cross-section widths with approximately equal cross-section areas that enable the rotor blade to have a stiffness and tip deflection similar to conventional rotor blades that include a panel wall having a greater length, and include sparcaps with symmetric cross-section widths.

Figure 1:
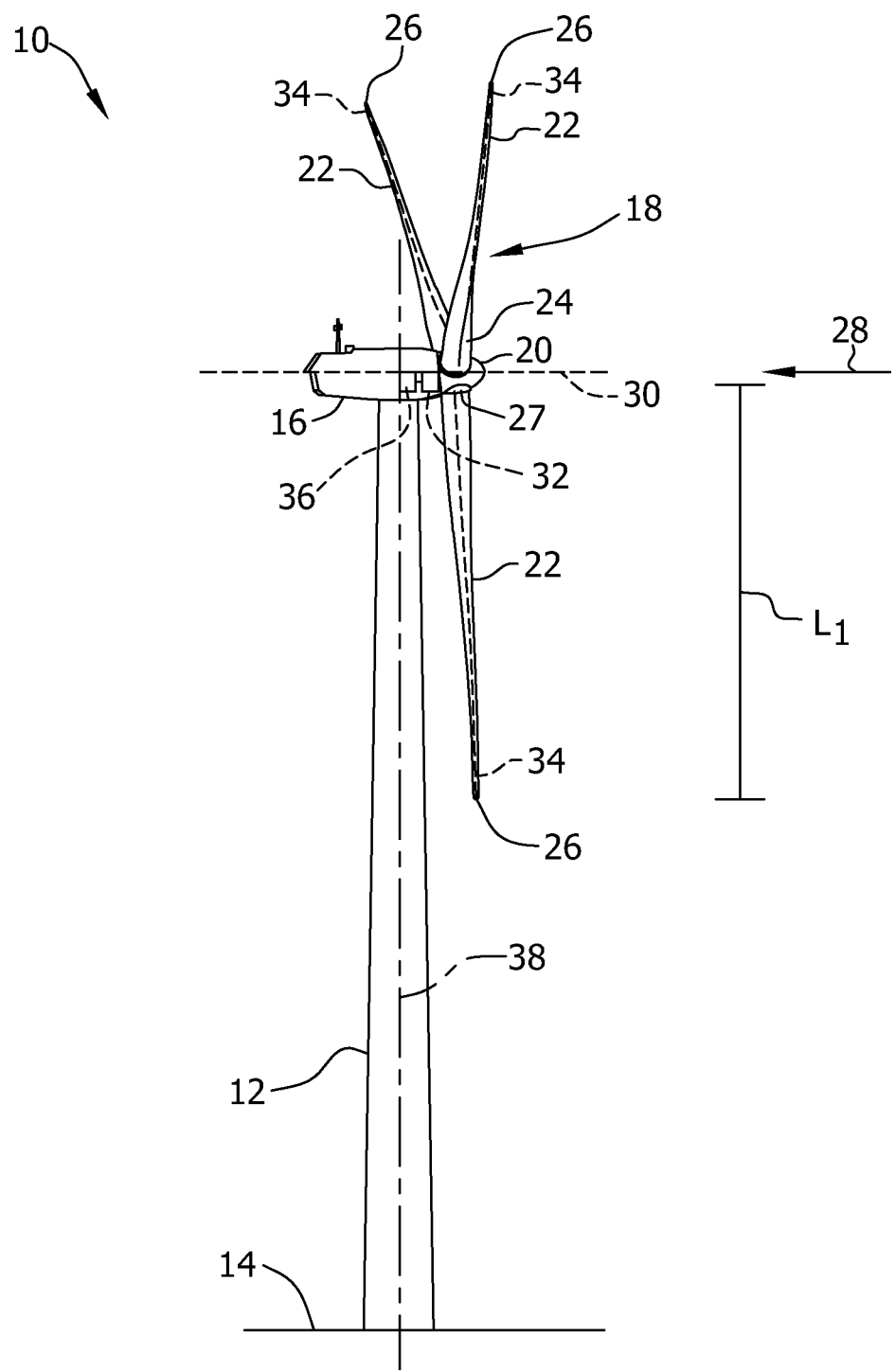
FIGS. 1-9 show exemplary embodiments of the systems and methods described herein.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower having any suitable height.

Rotor blades 22 are spaced about hub 20 to facilitate rotating rotor 18. Rotor blades 22 include a blade root portion 24 and a blade tip portion 26, and are mated to hub 20 by coupling blade root portion 24 to hub 20 at a plurality of load transfer regions 27. Load transfer regions 27 have a hub load transfer region and a blade load transfer region (both not shown in FIG. 1). Loads induced to rotor blades 22 are transferred to hub 20 by load transfer regions 27.

In the exemplary embodiment, rotor blades 22 have a length $L_1$ that extends from blade root portion 24 to blade tip portion 26. In one embodiment, length $L_1$ has a range from about 15 meters (m) to about 91 m. Alternatively, rotor blades 22 may have any suitable length that enables wind turbine 10 to function as described herein. For example, other non-limiting examples of blade lengths include 10 m or less, 20 m, and 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. A pitch adjustment system 32 rotates rotor blades 22 about a pitch axis 34 for adjusting an orientation of rotor blades 22 with respect to direction 28 of the wind. A speed of rotation of rotor 18 may be controlled by adjusting the orientation of at least one rotor blade 22 relative to wind vectors. In the exemplary embodiment, a pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

Figure 2:
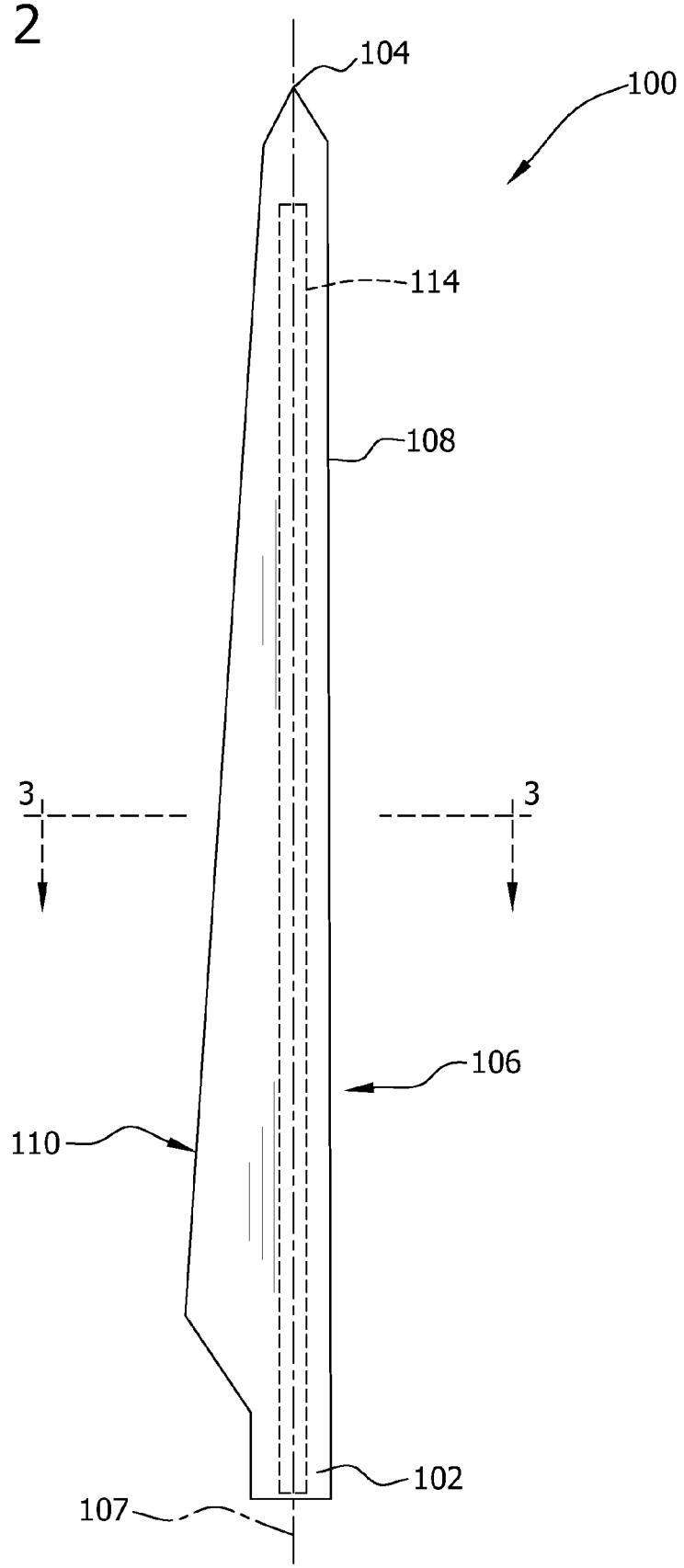
Figure 3:
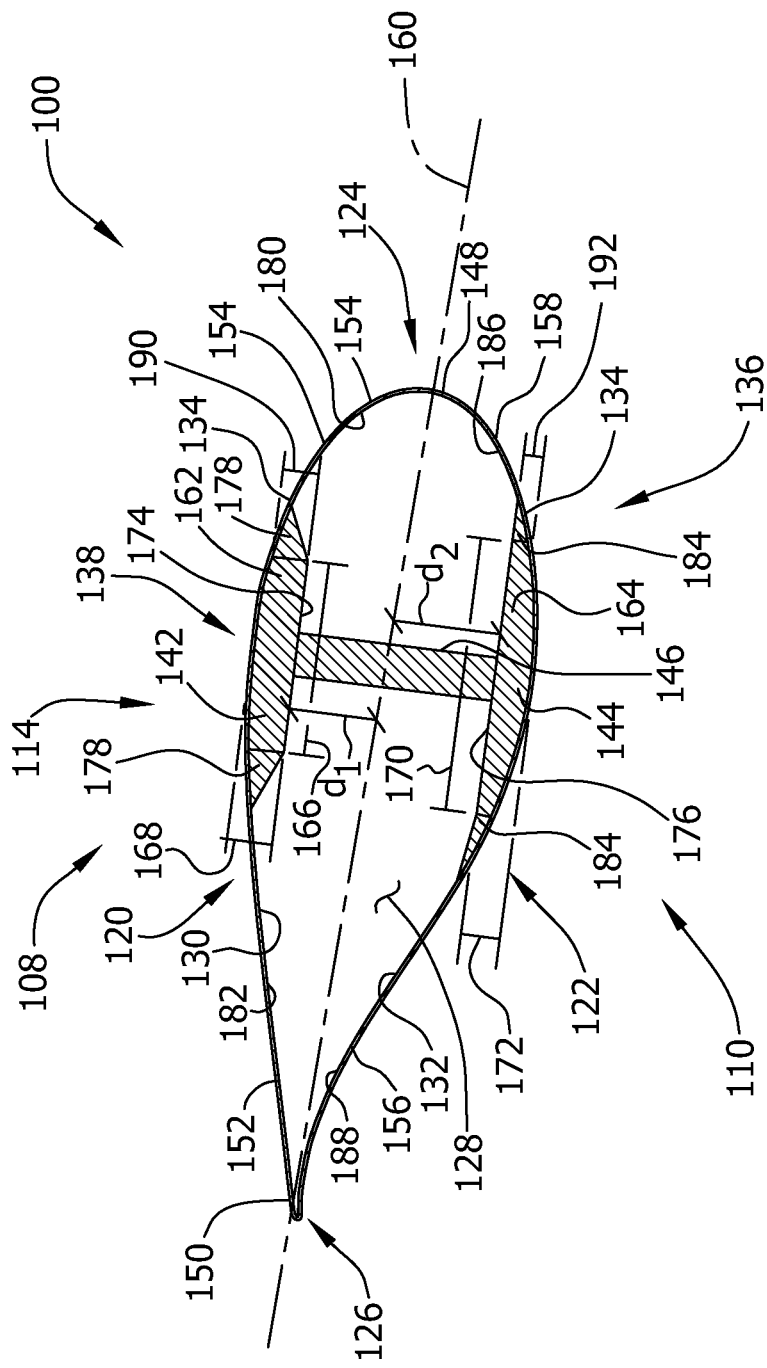

FIG. 2 is a sectional view of an exemplary rotor blade 100 suitable for use with wind turbine 10. FIG. 3 is a cross-sectional view of exemplary rotor blade 100 along chordwise sectional line 3-3 in FIG. 2. Identical components illustrated in FIG. 3 are labeled with the same reference numbers used in FIG. 2. Rotor blade 100 includes a first or root end 102 configured to facilitate mounting rotor blade 100 to hub 20 and a second or tip end 104 opposing root end 102. A body 106 of rotor blade 100 extends between root end 102 and tip end 104 and along a longitudinal axis 107. In one embodiment, rotor blade 100 includes a first blade section 108, such as a suction side blade section, and an opposing second blade section 110 (shown in FIG. 3), such as a pressure side blade section, coupled to first blade section 108 to form rotor blade 100. A spar 114 is coupled to and extends between first blade section 108 and second blade section 110. In the exemplary embodiment, spar 114 extends almost the full longitudinal length of rotor blade 100. Alternatively, spar 114 extends at least partly along the longitudinal length of rotor blade 100. As used herein, the term "longitudinal length" refers to a length of body 106 along the longitudinal axis 107 of rotor blade 100.

Referring to FIG. 3, in the exemplary embodiment, rotor blade 100 includes a first or suction sidewall 120 and a cooperating second or pressure sidewall 122. Pressure sidewall 122 is coupled to suction sidewall 120 along a leading edge 124 and along an opposing trailing edge 126. Suction sidewall 120 and pressure sidewall 122 are coupled together to define a cavity 128 between suction sidewall 120 and pressure sidewall 122. Specifically, cavity 128 is bordered at least in part by an inner surface 130 of suction sidewall 120 and an inner surface 132 of pressure sidewall 122. A blade skin 134 is coupled to a pressure sidewall outer surface 136 and to a suction sidewall outer surface 138 to form rotor blade 100 defining a contour of rotor blade 100 as shown in the cross-section views. Spar 114 is positioned within cavity 128 and extends between pressure sidewall 122 and suction sidewall 120. Spar 114 includes a first or suction side sparcap 142, a second or pressure side sparcap 144, and at least one shearweb 146 that extends between suction side sparcap 142 and pressure side sparcap 144. A nose bonding cap 148 is coupled to suction sidewall 120 and pressure sidewall 122 to form leading edge 124. A trailing edge bonding cap 150 is coupled to suction sidewall 120 and pressure sidewall 122 to form trailing edge 126.

In the exemplary embodiment, suction sidewall 120 includes a suction side trailing edge panel 152 coupled to suction side sparcap 142, and a suction side leading edge panel 154 coupled to suction side sparcap 142. Suction side trailing edge panel 152 is coupled to trailing edge bonding cap 150 and extends between trailing edge bonding cap 150 and suction side sparcap 142. Suction side leading edge panel 154 is coupled to nose bonding cap 148 and extends between nose bonding cap 148 and suction side sparcap 142.

Pressure sidewall 122 includes a pressure side trailing edge panel 156 and a pressure side leading edge panel 158. Pressure side trailing edge panel 156 is coupled to pressure side sparcap 144 and extends between pressure side sparcap 144 and trailing edge bonding cap 150. Pressure side leading edge panel 158 is coupled to pressure side sparcap 144 and extends between pressure side sparcap 144 and nose bonding cap 148.

Suction side sparcap 142 and pressure side sparcap 144 each includes a cross-section area equal to a product of a chordwise thickness and a chordwise width as measured along a neutral axis 160 that extends from leading edge 124 to trailing edge 126. In the exemplary embodiment, suction side sparcap 142 has a first cross-section area 162. Pressure side sparcap 144 has a second cross-section area 164 that is approximately equal to first cross-section area 162. Suction side sparcap 142 further has a first chordwise width 166 and a first maximum chordwise thickness 168. Pressure side sparcap 144 has a second chordwise width 170 that is longer than first chordwise width 166, and a second maximum chordwise thickness 172 that is less than first maximum chordwise thickness 168.

In the exemplary embodiment, suction side sparcap 142 has an inner surface 174 that is positioned at a first distance $d_1$ from rotor blade neutral axis 160. Pressure side sparcap 144 has an inner surface 176 that is positioned at a second distance $d_2$ from neutral axis 160 that is greater than first distance $d_1$. The greater second distance $d_2$ enables pressure side sparcap 144 to compensate for a reduced stiffness as a result of a shorter maximum chordwise thickness 172 as compared to suction side sparcap 142 maximum chordwise thickness 168.

One or more suction side core fillets 178 are coupled to suction side sparcap 142, suction side trailing edge panel 152, and/or to suction side leading edge panel 154 to provide a smooth surface-transition between suction side sparcap inner surface 174 and an inner surface 180 of suction side leading edge panel 154, and between inner surface 174 and an inner surface 182 of suction side trailing edge panel 152. One or more pressure side core fillets 184 are coupled to pressure side sparcap 144, to pressure side leading edge panel 158, and/or to pressure side trailing edge panel 156 for providing a smooth surface-transition between inner surface 176 of pressure side sparcap 144 and an inner surface 186 of pressure side leading edge panel 158, and between inner surface 176 and an inner surface 188 of pressure side trailing edge panel 156. In the exemplary embodiment, suction side core fillets 178 have a third maximum chordwise thickness 190. Pressure side core fillets 184 have a fourth maximum chordwise thickness 192 that is less than third maximum chordwise thickness 190.

Figure 4:
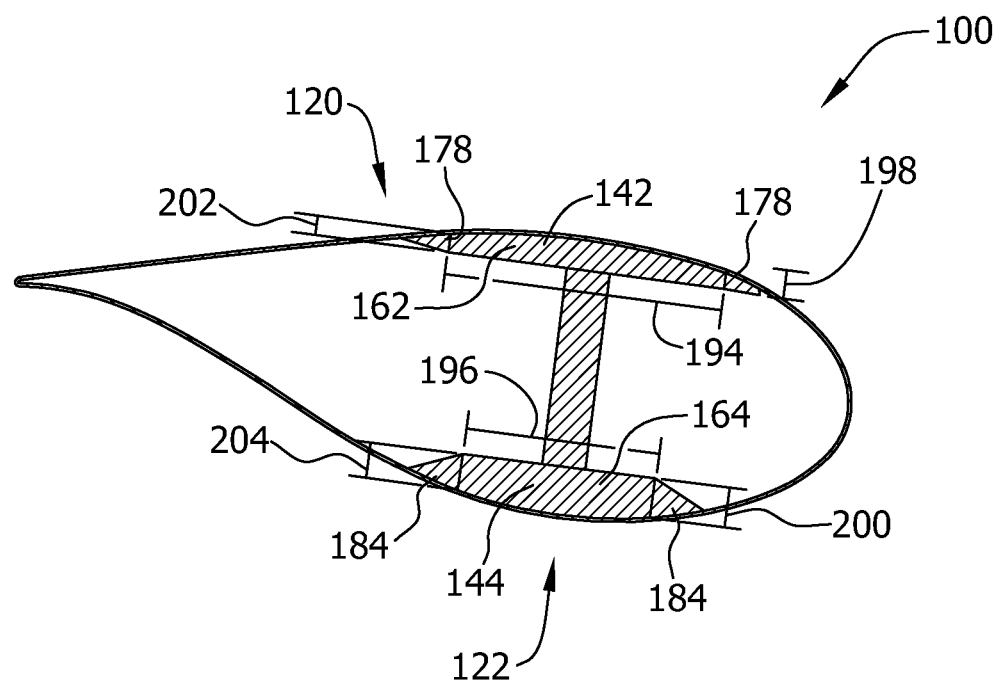
Figure 5:
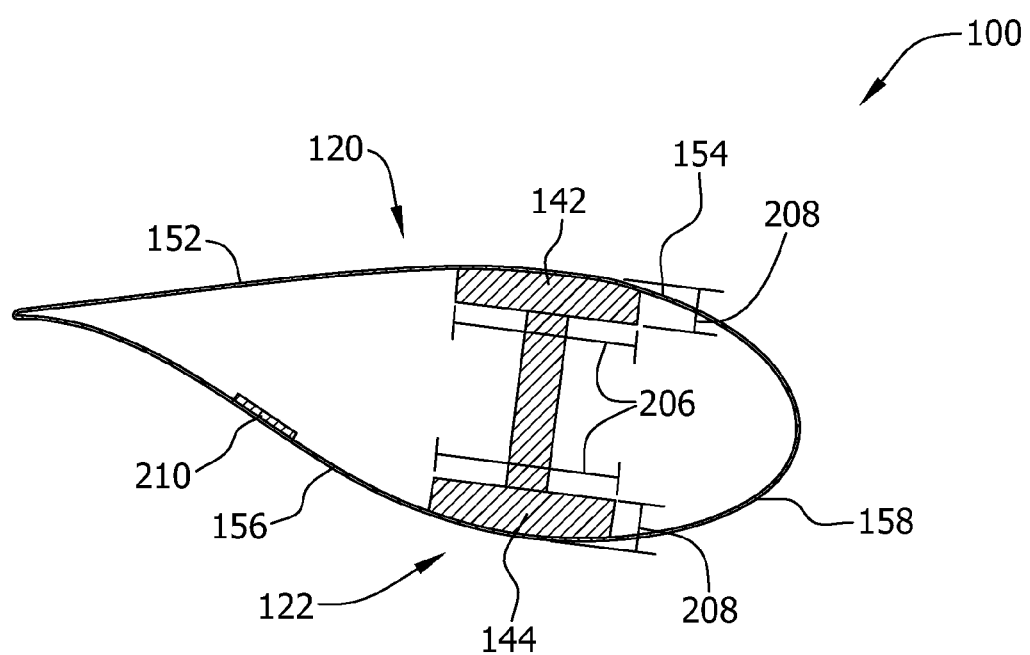
Figure 6:
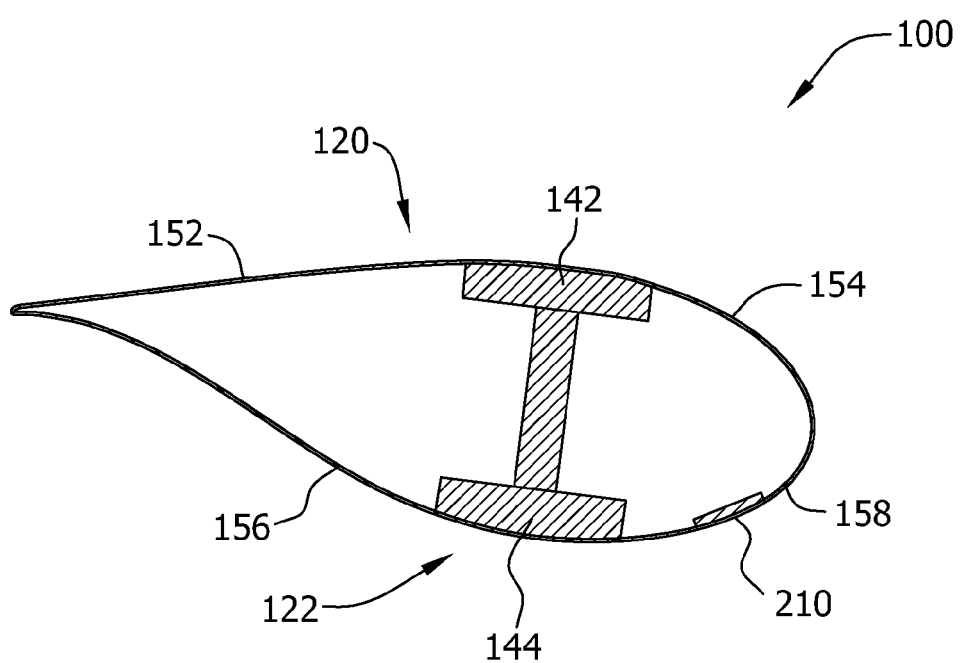

FIGS. 4-6 are cross-sectional views of alternative embodiments of rotor blade 100. Identical components illustrated in FIGS. 4-6 are labeled with the same reference numbers used in FIG. 3. Referring to FIG. 4, in an alternative embodiment, suction side sparcap cross-section area 162 is approximately equal to pressure side sparcap cross-section area 164. Suction side sparcap 142 has a chordwise width 194 and pressure side sparcap 144 has a chordwise width 196. Suction side sparcap 142 has a maximum chordwise thickness 198 and pressure side sparcap 144 has a maximum chordwise thickness 200. In this alternative embodiment, suction side sparcap chordwise width 194 is greater than pressure side sparcap chordwise width 196, and suction side sparcap maximum chordwise thickness 198 is less than pressure side sparcap maximum chordwise thickness 200. Additionally, suction side core fillets 178 have a thickness 202 that is less than a thickness 204 of pressure side core fillets 184.

Referring to FIG. 5, in a further alternative embodiment, suction side sparcap 142 is substantially symmetrical to pressure side sparcap 144. Each of suction side sparcap 142 and pressure side sparcap 144 includes a width 206 and maximum chordwise thickness 208 that are approximately equal to each other. In this alternative embodiment, a third sparcap 210 is coupled to pressure sidewall 122 at pressure side trailing edge panel 156. The addition of third sparcap 210 during rotor blade 100 assembly allows a length of pressure side trailing edge panel 156 to be shortened as compared to conventional rotor blades that include a panel wall having a greater length and sparcaps with symmetric cross-section widths. Alternatively, third sparcap 210 is coupled to suction sidewall 120 at suction side trailing edge panel 152.

Referring to FIG. 6, in a further alternative embodiment, suction side sparcap 142 is substantially symmetrical to pressure side sparcap 144. In this embodiment, third sparcap 210 is coupled to pressure sidewall 122 at pressure side leading edge panel 158. The addition of third sparcap 210 during rotor blade 100 assembly allows a length of pressure side leading edge panel 158 to be shortened as compared to conventional rotor blades. Alternatively, third sparcap 210 is coupled to suction sidewall 120 at suction side leading edge panel 154, which allows a length of suction side leading edge panel 154 to be reduced.

Figure 7:
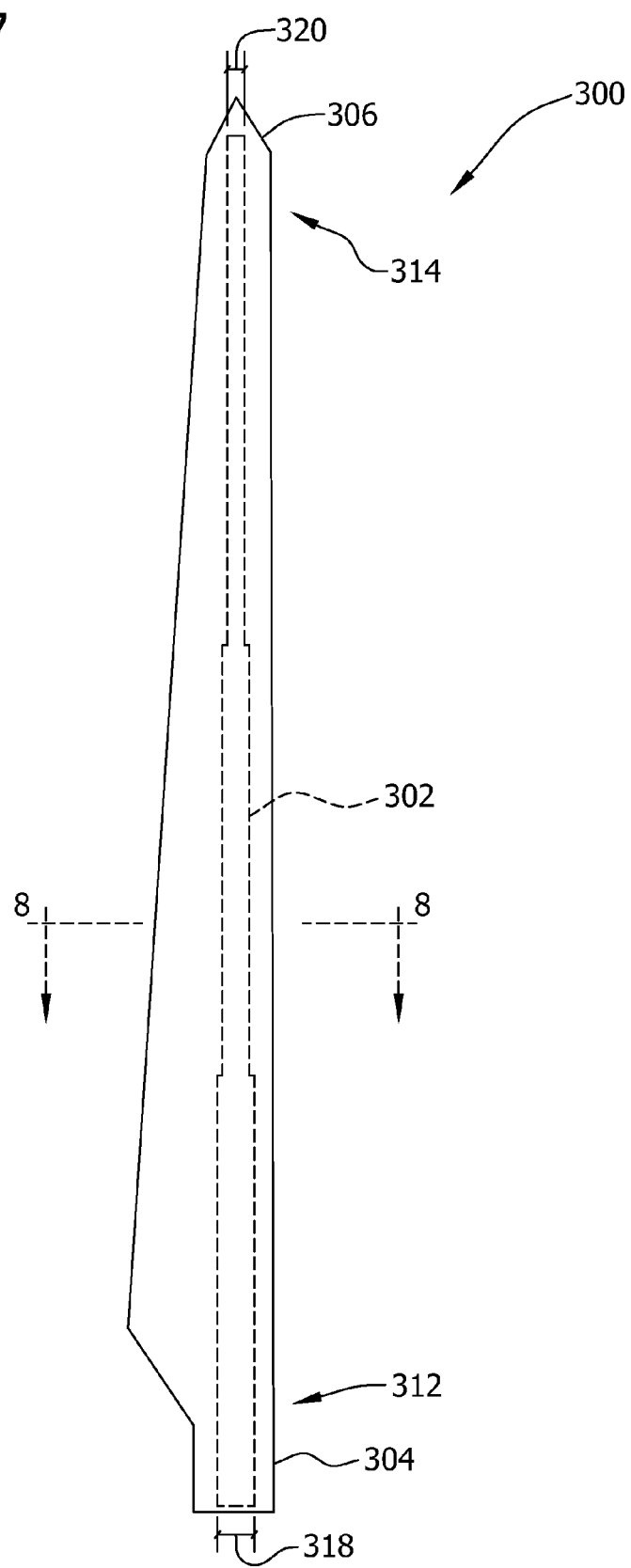
Figure 8:
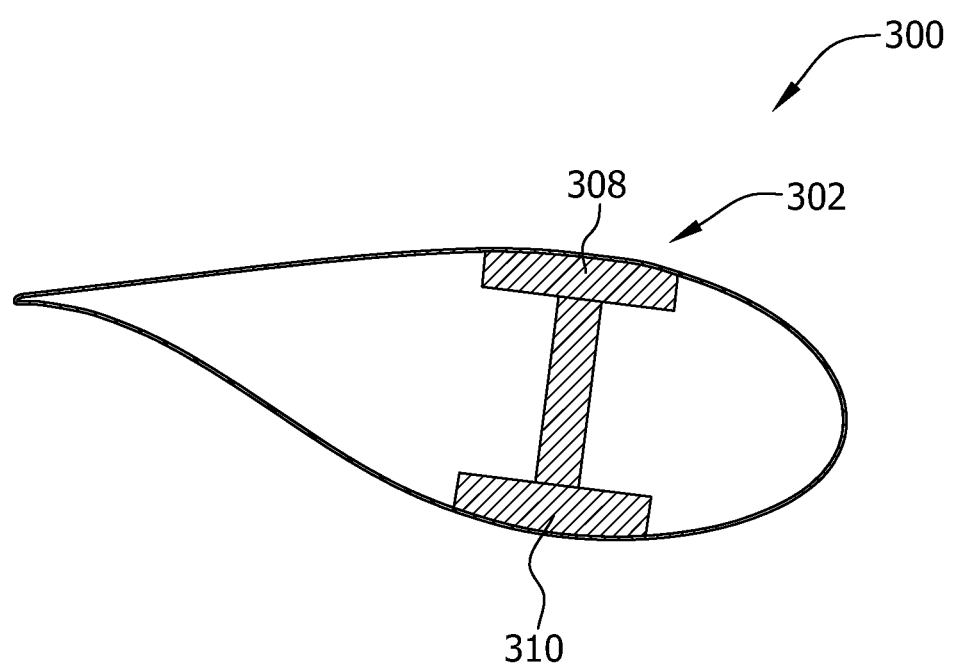

FIG. 7 is a sectional view of an alternative rotor blade 300. FIG. 8 is a cross-sectional view of rotor blade 300 along chordwise sectional line 8-8 in FIG. 7. Identical components illustrated in FIG. 8 are labeled with the same reference numbers used in FIG. 7. In this alternative embodiment, rotor blade 300 includes a spar 302 that extends from a root end 304 towards a tip end 306, extending substantially along the full longitudinal length of rotor blade 300. Spar 302 includes a suction side sparcap 308 and a pressure side sparcap 310. Each of suction side sparcap 308 and pressure side sparcap 310 includes a first or root portion 312 positioned at or near rotor blade root end 304, and a second or tip portion 314 positioned at or near rotor blade tip end 306. Root portion 312 has a first chordwise width 318. Tip portion 314 has a second chordwise width 320 that is less than first chordwise width 318. In this embodiment, spar 302 includes a stepped width extending from rotor blade root end 304 to rotor blade tip end 306 along the longitudinal length of rotor blade 300. Alternatively, spar 302 includes a tapered width extending from rotor blade root end 304 to rotor blade tip end 306 along the longitudinal length of rotor blade 300.

Figure 9:
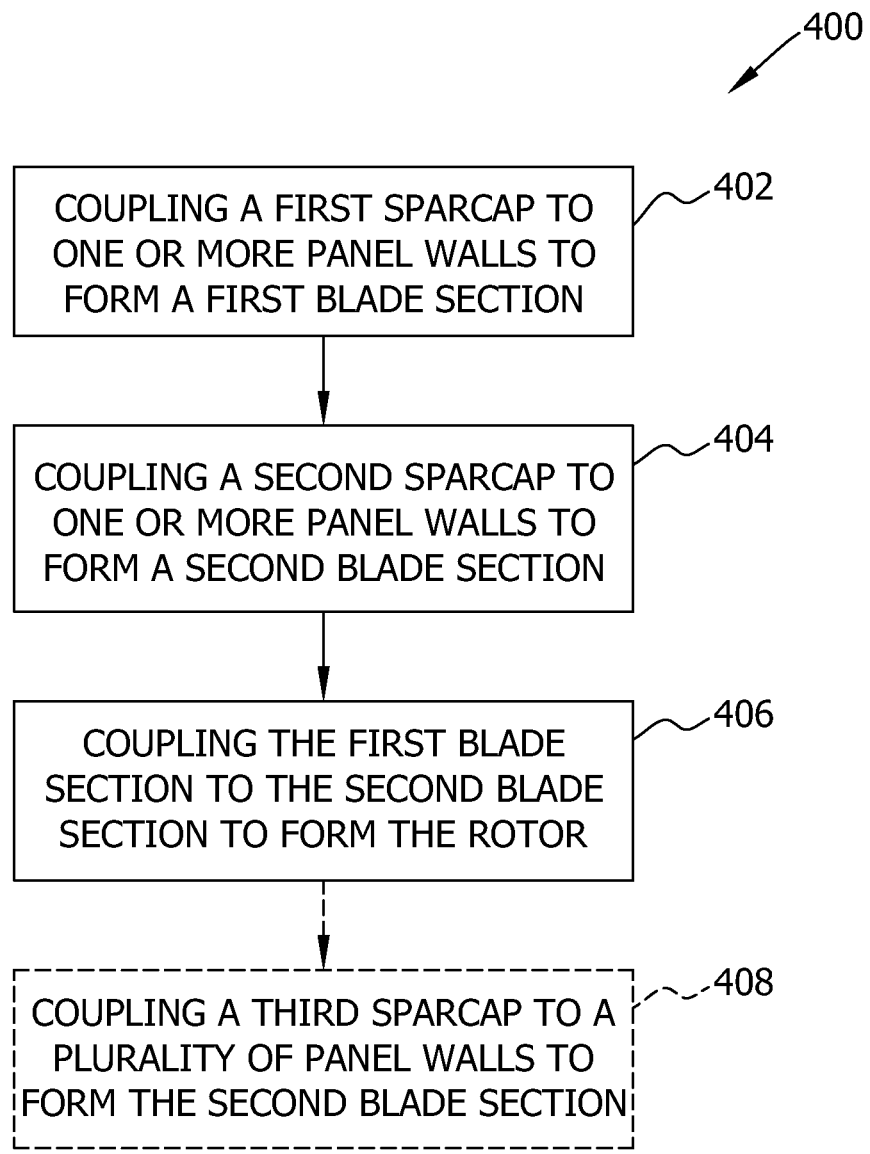

FIG. 9 is a flowchart of an exemplary method 400 for assembling wind turbine rotor blade 100. In the exemplary embodiment, method 400 includes coupling 402 a first sparcap 142 to one or more panel walls to form a first blade section 120. Second sparcap 144 is coupled 404 to one or more panel walls to form second blade section 122. First blade section 120 is coupled 406 to second blade section 122 to form rotor blade 100. Third sparcap 210 is optionally coupled 408 to one or more panel walls while forming first blade section or second blade section 122.

The above-described systems and methods facilitate assembling a rotor blade that meets conventional rotor blade stiffness and deflection requirements with a reduced length of the panel wall. Panel walls are typically more expensive to manufacture than sparcaps and include a more expensive material. More specifically, the rotor blade described herein includes sparcaps that have asymmetric cross-section widths with approximately equal cross-section areas that provide a sufficient blade stiffness that enables the rotor blade to have a suitable tip deflection similar to conventional rotor blades and to satisfy strength, bending stiffness, and buckling stiffness requirements of known wind turbine rotor blades. In addition, by providing sparcaps with asymmetric cross-section widths, a reduced amount of more expensive panel material is required to be included in a blade section, thereby reducing the overall costs of manufacturing the rotor blade. As such, the cost of assembling a wind turbine is significantly reduced.

Exemplary embodiments of systems and methods for assembling a rotor blade for use in a wind turbine are described above in detail. The systems and methods are not limited to the specific embodiments described herein, but rather, components of systems and/or steps of the methods may be utilized independently and separately from other components and/or steps described herein. For example, the methods may also be used in combination with other rotor blade improvement systems and methods, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A method of assembling a rotor blade having a leading edge and a trailing edge for a wind turbine, the method comprising:
coupling a first sparcap to at least one suction panel wall to form a first blade section, the first sparcap having a first chordwise width;

coupling a second sparcap to at least one pressure panel wall to form a second blade section, the second sparcap having a second chordwise width that is larger than the first chordwise width;

coupling a shearweb to said first sparcap and said second sparcap and centrally positioned relating to said first chordwise width and said second chordwise width; and, coupling the first blade section to the second blade section at the leading edge and the trailing edge to form the rotor blade.

2. A method in accordance with claim 1, wherein coupling the second sparcap having the second chordwise width larger than the first chordwise width facilitates reducing a length of the pressure panel wall.

3. A method in accordance with claim 1, further comprising coupling a third sparcap to one of the suction panel wall and the pressure panel wall, wherein the third sparcap is positioned adjacent a leading edge of the rotor blade.

4. A method in accordance with claim 1, further comprising coupling a third sparcap to one of the suction panel wall and the pressure panel wall, wherein the third sparcap is positioned adjacent a trailing edge of the rotor blade.

5. A rotor blade having a neutral axis extending between a leading edge and a trailing edge for use with a wind turbine, the rotor blade comprising:
   a first blade section comprising at least one suction panel wall;
   a second blade section comprising at least one pressure panel wall, said second blade section coupled to said first blade section to form said rotor blade;
   a first sparcap coupled to said first blade section and positioned at a first distance from the neutral axis, said first sparcap having a first chordwise width; and,
   a second sparcap coupled to said second blade section and positioned at a second distance from the neutral axis that is greater than said first distance, said second sparcap having a second chordwise width that is greater than the first chordwise width.

6. A rotor blade in accordance with claim 5, wherein said second sparcap has the second chordwise width that is greater than the first chordwise width for reducing a length of the pressure panel wall.

7. A rotor blade in accordance with claim 5, wherein said first sparcap has a first chordwise cross-section area, said second sparcap has a second chordwise cross-section area that is equal to the first chordwise cross-section area.

8. A rotor blade in accordance with claim 5, wherein said rotor blade includes a leading edge and a trailing edge, said rotor blade further comprises a third sparcap coupled to one of said first blade section and said second blade section adjacent at least one of the leading edge and the trailing edge.

9. A rotor blade in accordance with claim 5, wherein said first sparcap has a first thickness and said second sparcap has a second thickness that is less than said first thickness.

10. A rotor blade in accordance with claim 5, further comprising:
   at least one first core fillet coupled to said first blade section, said first core fillet having a third chordwise width; and,
   at least one second core fillet coupled to said second blade section, said second core fillet having a fourth chordwise width that is less than said third chordwise width.

11. A rotor blade in accordance with claim 5, further comprising a root portion and a tip portion, said first sparcap and said second sparcap extending from said root portion towards said tip portion, wherein the first chordwise width and the second chordwise width each are shorter at said tip portion than at said root portion.

12. A wind turbine, comprising:
   a tower;
   a nacelle coupled to said tower;
   a hub rotatably coupled to said nacelle; and,
   at least one rotor blade coupled to said hub, said rotor blade having a neutral axis extending between a leading edge and a trailing edge and comprising:
      a first blade section comprising at least one suction panel wall;
      a second blade section comprising at least one pressure panel wall, said second blade section coupled to said first blade section to form said rotor blade;
      a first sparcap coupled to said first blade section and positioned at a first distance from the neutral axis, said first sparcap having a first chordwise width; and,
      a second sparcap coupled to said second blade section and positioned at a second distance from the neutral axis that is greater than said first distance, said second sparcap having a second chordwise width that is greater than the first chordwise width.

13. A wind turbine in accordance with claim 12, wherein said second sparcap has the second chordwise width that is greater than the first chordwise width for reducing a length of the pressure panel wall.

14. A wind turbine in accordance with claim 12, wherein said first sparcap has a first chordwise cross-section area, said second sparcap has a second chordwise cross-section area that is equal to said first chordwise cross-section area.

15. A wind turbine in accordance with claim 12, wherein said rotor blade includes a leading edge and a trailing edge, said rotor blade further comprises a third sparcap coupled to one of said first blade section and said second blade section adjacent the leading edge.

16. A wind turbine in accordance with claim 12, wherein said rotor blade includes a leading edge and a trailing edge, said rotor blade further comprises a third sparcap coupled to one of said first blade section and said second blade section adjacent the trailing edge.

17. A wind turbine in accordance with claim 12, wherein said rotor blade further comprises:
   at least one first core fillet coupled to said first blade section, said first core fillet having a third chordwise width; and,
   at least one second core fillet coupled to said second blade section, said second core fillet having a fourth chordwise width that is less than said third chordwise width.

18. A wind turbine in accordance with claim 12, wherein said at least one rotor blade further comprises a root portion and a tip portion, said first sparcap and said second sparcap extending from said root portion towards said tip portion, wherein the first chordwise width and the second chordwise width each are shorter at said tip portion than at said root portion.

* * * * *